United States Patent [19]

Vaidyanathan

[11] Patent Number: 4,585,711
[45] Date of Patent: Apr. 29, 1986

[54] HYDROGEN ELECTRODE FOR A FUEL CELL

[75] Inventor: Hariharan Vaidyanathan, Rockville, Md.

[73] Assignee: Communications Satellite Corporation, Washington, D.C.

[21] Appl. No.: 561,509

[22] Filed: Dec. 15, 1983

[51] Int. Cl.[4] .............................................. H01M 4/86
[52] U.S. Cl. ...................................... 429/42; 429/44; 29/623.5
[58] Field of Search ....................... 429/40, 42, 44, 45; 502/101; 29/623.1, 623.5, 623.4

[56] References Cited

U.S. PATENT DOCUMENTS

| | | | |
|---|---|---|---|
| 3,425,875 | 2/1969 | Adhart et al. | 502/101 |
| 3,704,171 | 11/1972 | Landi | 429/42 |
| 4,058,482 | 11/1977 | Baris et al. | 502/101 |
| 4,337,140 | 6/1982 | Solomon | 429/42 |
| 4,339,325 | 7/1982 | Solomon et al. | 429/42 |
| 4,440,617 | 4/1984 | Solomon | 429/42 |

Primary Examiner—Charles F. LeFevour
Attorney, Agent, or Firm—Sughrue, Mion, Zinn, Macpeak and Seas

[57] ABSTRACT

A hydrogen electrode and the method of making the electrodes usable in a fuel cell comprising a perforated nickel foil current collector, the back side of which is sealed with a semi-permeable membrane of polytetrafluoroethylene (PTFE) with a thickness of 50 $\mu$m and a pore diameter of 0.2 $\mu$m. The front side is sealed with an electrocatalytic layer of about 25 $\mu$m thickness. The electrocatalytic layer contains 75%, by weight, catalyst (carbon particles coated with a layer of catalyzing platinum) with a platinum loading of 0.25–0.6 mg/cm$^2$. The platinum-covered carbon black is dispersed and embedded as individual but touching granules in strands of PTFE composing 25% of the layer. The porosity of the layer is 80% with a mean volume pore diameter of 10 $\mu$m. The strands are obtained by roll compaction of granular PTFE.

16 Claims, 2 Drawing Figures

HYDROGEN ELECTRODE FOR A FUEL CELL

BACKGROUND OF THE INVENTION

The invention relates generally to electrical energy storage devices, and in particular to a hydrogen electrode in such devices.

Electrical energy can be stored in an electric battery, e.g. a lead-acid battery. In a time battery, the electrical energy is stored in the electrodes. Reduction-oxidation or redox reactions occur between the electrodes and an electrolyte in which the electrodes are immersed. As a result of the redox reactions, the electrodes are chemically changed during charging or discharging.

Another type of electrical energy storage device is a fuel cell. In a fuel cell reversible electrochemical reactions occur between the fuels. Typically the electrodes not only provide electrical contact to the electrochemical reaction but also catalyze the reaction. However, the electrical energy resides in the fuel and not in the electrodes. Thus the electrodes do not chemically change for a well functioning fuel cell. If the fuel cell is a closed system so that additional fuel is not introduced into the cell during its operation, such a fuel cell is often, if loosely, referred to as a battery because its operational characteristics are similar to those of a true battery.

A third type of electrical energy storage device is a hybrid of the previously described battery and fuel cell. One electrode reacts directly with an electrolyte, similarly to a battery electrode, while the other electrode only catalyzes a reaction between the electrolyte and another fuel, similarly to a fuel cell electrode. An example of such a hybrid is the nickel-hydrogen battery which is the subject of U.S. Pat. No. 3,867,119, issued to Dunlop et al.

A variant of the nickel-hydrogen cell of Dunlop will now be described with reference to the schematic cross-section of FIG. 1. A nickel electrode or cathode 10 is in contact with an electrolyte 12, such as potassium hydroxide (KOH), in aqueous solution. A redox reaction occurs between the nickel electrode 10 and the electrolyte 12. The reaction is of the form:

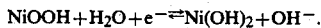

$$NiOOH + H_2O + e^- \rightleftharpoons Ni(OH)_2 + OH^-.$$

The reaction flows to the right upon discharging and to the left upon charging.

On the other side of the cell there is a conductive anode 14 that is covered with a layer of platinum catalyst 16 in contact with another portion of the electrolyte 18. A semi-permeable membrane 20 allows hydrogen from a reservoir 22 to reach the anode 14 and the catalytic layer 16 but prevents the electrolyte 18 from flowing into the reservoir 22. The combination of the anode 14, the platinum catalyst 16 and the semi-permeable membrane 20 are commonly referred to as a negative electrode because they are usually formed in one structural unit. The reaction which occurs at the hydrogen electrode is of the form:

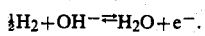

$$\tfrac{1}{2}H_2 + OH^- \rightleftharpoons H_2O + e^-.$$

This reaction flows to the right upon discharging and to the left upon charging. As it is seen from the form of this reaction, the hydrogen is reacting with the electrolyte. The anode 14 serves only as an electrical conductor for the charge generated or consumed in the reaction and the platinum catalyst 16, while greatly promoting the reaction, is not consumed in the reaction.

The two portions of the electrolyte 12 and 18 are separated by a separator 24 which acts as an electrical barrier and for storage of the electrolyte 12 and 18.

The platinum catalyst 16 or electrocatalyst layer should have both hydrophilic and hydrophobic properties. It should be hydrophilic so that it admits the aqueous electrolyte and should be hydrophobic in order that it does not attract the electrolyte so strongly that the gaseous hydrogen cannot penetrate the catalyst 16. A conventional electrocatalyst layer 16 has an active component of platinum black, which is composed of high surface area platinum. The effect is to provide a very large surface area of the catalyzing platinum with a relatively small amount of expensive platinum. To provide the hydrophobic properties of the catalyst layer 16, the platinum black is dispersed in polytetrafluoroethylene (PTFE), marketed by Dupont under the trade name Teflon. The semi-permeable membrane 20, also referred to as the wet-proofing layer, is conventionally composed of a film of Teflon.

One prior art method of preparing a hydrogen electrode involves pasting the electrocatalyst onto a nickel screen substrate backed with a porous Teflon membrane. The procedure consists in preparing a slurry of platinum black, Teflon 30 emulsion and methocel (carboxymethyl cellulose). Nickel exmet (extruded metal) is formed by scoring regular slits in a nickel sheet and pulling the sheet transversely to the slits. The result is a perforated but continuous sheet of metal. An exmet is superior to a screen because of the absence of electrical contacts at the grid points. A Teflon backing is applied to the back of the nickel exmet and then the slurry is silkscreened onto the front of the nickel exmet. The electrode is then dried in air, heated to 100° C. and finally sintered at 330° C.

Another conventional procedure consists in spraying a mixture of platinum black, wetting agent and Teflon 30 emulsion onto a nickel exmet with a porous Teflon backing.

Most of the fabrication methods are directed at dispersing platinum black in Teflon so that a loading or density of platinum can be limited to 6–8 mg/cm² of Pt. Recently, electrocatalyst formulations consisting of platinum dispersed in high surface area carbon have been invented which exhibit properties equivalent to that of platinum. The major benefit of using the combination of carbon and platinum is the reduction in cost.

Many U.S. patents have disclosed different methods of fabricating Teflon-bonded electrodes containing platinum. Solomon in U.S. Pat. No. 4,370,284 discloses a fabrication procedure for a non-bleeding electrode. A bleeding electrode is one that exhibits excessive hydrophobic tendencies so that bubbles of water form on its surface thus preventing the free flow of hydrogen gas. In Solomon's method, the electrocatalyst layer consists of 60–90% pure carbon and 10–40% polytetrafluoroethylene (PTFE). Furthermore a PTFE-containing wet-proofing layer is applied to the back of the electrode. The pore diameter in the electrocatalyst and the backing layer is controlled. A related defect is flooding in which an excessively hydrophilic electrode attracts too much electrolyte and prevents gas flow.

In U.S. Pat. No. 4,336,217, Sauer discloses a continuous manufacturing procedure for a plastic cohered gas diffusion electrode in which PTFE and carbon powder are mixed in a paddle mixer to enhance the degree of subdivision and homogeneity of the mixture in addition to temporarily vaporizing the PTFE. The formulation is then reduced to foils by means of powder rollers.

Baker et al., in U.S. Pat. No. 3,935,029, discloses an electrode fabrication procedure which uses a conductive carbon support produced by the rolling of carbon, a lubricant and PTFE.

Solomon, in another patent, U.S. Pat. No. 4,337,140, discloses an electrode containing an active layer of strengthened carbon and PTFE. The active layers are fibrillated along with a soluble pore-forming agent.

Witherspoon, in U.S. Pat. No. 3,779,872, discloses a gas electrode containing PTFE. The electrode is treated with magnesium acetate to increase the active surface area.

Baker et al, in U.S. Pat. No. 3,943,006, discloses an electrode structure for fuel cells in which catalysts, PTFE and sugar are blended together. The formulation is then rolled and the sugar is finally leached out.

Heffler, in U.S. Pat. No. 4,104,197, discloses a gas diffusion electrode having a hydrophobic layer containing pores with a diameter of 1.8 $\mu$m and a hydrophilic layer containing pores of diameter 0.09 $\mu$m. The electrode is prepared using a filter press.

All of the prior art electrodes suffer various disadvantages. In order to achieve proper electrolyte distribution among the positive and negative electrodes and the separator, the mean pore diameter of the negative electrode must be larger than the pore diameters of the other parts. This condition is not achieved in any of the prior art electrodes.

The hydrogen electrodes, based on pure platinum, are highly expensive. The less expensive hydrogen electrodes using pure carbon exhibit high polarization in a metal-hydrogen battery. Polarization is a measure of the efficiency of the hydrogen electrode. Under optimum conditions, the hydrogen electrode can produce a voltage of 0.9 V. However, if the reaction area is not sufficiently large for other reasons, this voltage may drop with the difference or polarization being a loss of energy and an inefficiency in voltage conversion.

Electrodes that are produced by pasting the electrocatalyst onto a mesh develop cracks and tears in the Teflon membrane in addition to spalling of the platinum black.

SUMMARY OF THE INVENTION

Accordingly, it is an object of the invention to provide a hydrogen electrode that minimizes the loading of platinum catalyst.

It is a further object of the invention to provide a hydrogen electrode that is easily fabricated.

Yet another object of the invention is to provide a hydrogen electrode having superior operating characteristics and not prone to failure.

The invention can be summarized as a hydrogen electrode having a nickel exmet current collector, the backside of which is covered with a porous polytetrafluoroethylene membrane and the front side of which is covered with an electrocatalyst layer having a very high surface area, composed of carbon containing platinum black entwined in polytetrafluoroethylene. The polytetrafluoroethylene used for processing is granular which is filamented by roll compaction.

DETAILED DESCRIPTION OF THE PREFERRED EMBODIMENT

Figure 1:
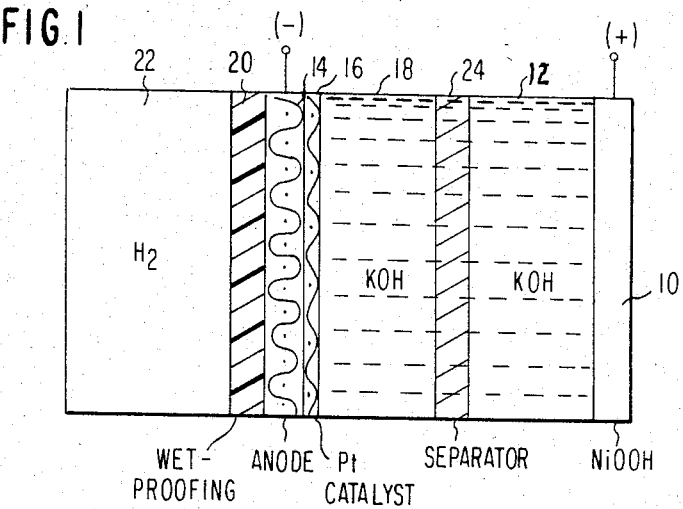
FIG. 1 is a schematic cross-section of a fuel cell using a hydrogen electrode.
Figure 2:
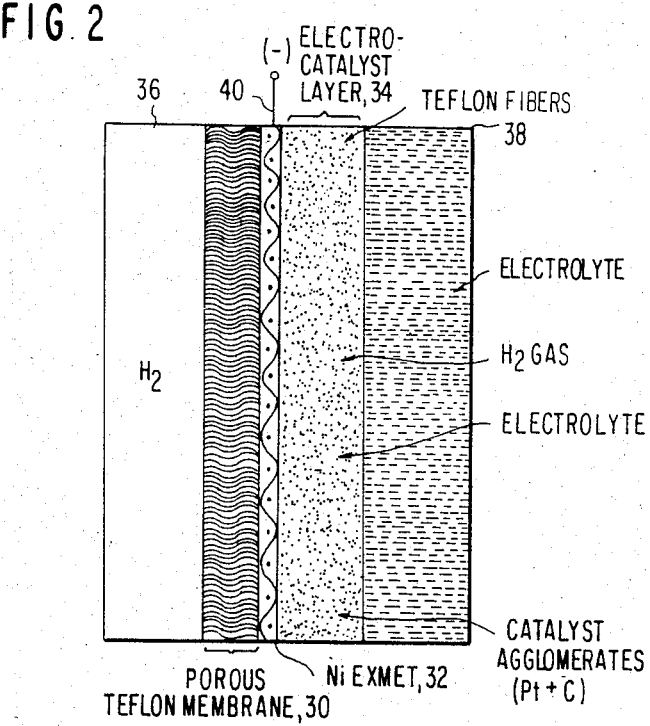
FIG. 2 is a schematic cross-section of the hydrogen electrode of this invention.

The invention is a hydrogen electrode of the gas diffusion layer type, similar to that described for FIG. 1. However, several improvements have been made, particularly in the electrocatalyst layer. A cross-section of the hydrogen electrode is shown in FIG. 2. The hydrogen electrode consists of a wet-proofing layer 30, a current collector 32 and an electrocatalyst layer 34. In normal operation, a reservoir 36 of hydrogen is adjacent the wet-proofing layer 30 and an electrolyte 38 touches the electrocatalyst layer 34. First, the structure of the hydrogen electrode of FIG. 2 will be described and then a process for making this electrode will be described.

The electrocatalyst part of the electrocatalyst layer 34 consists of very high surface area carbon that contains 5–10% platinum. Since the platinum is dispersed as a thin layer on carbon particles, the polarization characteristics approach those of pure platinum. The electrocatalyst is entwined in polytetrafluoroethylene (PTFE). The composition of the electrocatalyst layer 34 is 25% PTFE and 75% electrocatalyst by weight although the percentage of PTFE may vary between 23% and 33%. The PTFE areas in the electrode are hydrophobic and thus provide channels for the gas transport. The hydrophilic electrocatalyst is uniformly dispersed within the electrocatalyst layer 34. The ratio and distribution of PTFE and electrocatalysts are such that balanced hydrophobicity is achieved. This balanced hydrophobicity prevents electrode flooding and development of high overvoltage. The PTFE used for processing to form the electrocatalyst layer 34 is granular and is filamented by roll compaction. The strands of the PTFE form pockets containing the electrocatalyst. The volume of the pockets is such that a monolayer of the electrolyte engulfs the electrocatalytic particles.

The porosity of the electrocatalyst layer 34 is 80%. The porosity is a volume measure of the passageways through which the hydrogen and the electrolyte can flow. The pores of this layer have a medium volume pore diameter of 10 $\mu$m which provides a large surface area per unit weight. The medium pore diameter may be as high as 15 $\mu$m but cannot be less than 10 $\mu$m. The large surface area promotes efficient electrochemical reaction between the hydrogen and the electrolyte as catalyzed by the platinum. The pore diameter of 10 $\mu$m is higher than that of the typically used asbestos separator (0.6–1 $\mu$m) and also of the positive electrode (approximately 2–5 $\mu$m). Thus the electrolyte absorbency is in the order of: separator >positive> negative.

The electrocatalyst particles are dispersed and exist as individual granules in contact with each other but the granules are not agglomerated. The loading of the platinum on carbon electrocatalyst is between 6–8 mg/cm$^2$ which translates into a platinum loading of 0.25–0.6 mg/cm$^2$. The thickness of the electrocatalyst layer is 1 mil or 25 $\mu$m but may vary between 12 and 40 $\mu$m. This relative thinness considerably reduces the length of the diffusion paths.

The current collector 32 is made of nickel exmet to which the electrocatalyst layer 34 is sealed and fused. The nickel exmet is of the form having an industry designation of 3Ni-7-4/O. The numeral 3 designates the thickness of the nickel foil in mils before expansion. The numeral 7 refers to the thickness of the foil in mils after its sideways expansion. The additional thickness is caused by the warping of the foil in the vicinity of its perforations induced by the expansion. However, the foil is recompressed after expansion so that its final thickness is returned to the vicinity of 3 mils (75 $\mu$m). The final designation 4/O denotes the pattern of perforations upon the exmet foil. There are a total of 625 perforations or slits per square inch of the exmet. As measured in the direction of the slits, the center-to-center separation of the slits is 0.077 inches. The parallel separation between slits is 0.038 inches. Part of the nickel foil was left unperforated to leave a solid portion 40 forming the electrode tab.

The wet-proofing layer 30 is a PTFE membrane sealed to the current collector 32. The PTFE membrane is about 0.002 in. (50 $\mu$m) thick and is microporous with an average volume pore diameter of 0.2 $\mu$m. The thickness may vary between 25 and 75 $\mu$m and the median pore diameter between 0.1 and 0.3 $\mu$m. The PTFE membrane is leak-proof with respect to the electrolyte but permits the diffusion of hydrogen.

The process for fabricating a hydrogen electrode will now be described. The process demands the production of very thin films composed of electrocatalyst entwined in PTFE.

The following formulation is blended for five minutes in an industrial type Waring blender:
10% Pt on carbon 27.8 gm
Teflon composition 6C 9.6 gm
Ammonium bicarbonate 460 gm
Shell Sol No. 340 1.25 l.

The 10% platinum on carbon is a carbon black marketed by Johnson Mathey produced by the following method. Carbon powder having a surface area of 300–1,000 m$^2$/gm is suspended in a platinum chloride solution. Platinum metal is deposited on each carbon grain and the final product of platinum-coated carbon comprises 10% platinum by weight. The carbon is relatively unimportant except to form a supporting matrix and to provide electrical conductivity. Teflon composition 6C is marketed by Dupont and is an extruded powder of granular polytetrafluoroethylene (PTFE) having a diameter of 500±150 $\mu$m. Average diameters between 250 and 750 $\mu$m are acceptable. The Shell Sol No. 340 is a petroleum distillate or solvent market by Shell. Its typical composition is 47.2% paraffin, 50.2% naphthalene and 2.6% aromatics. It was selected because, at room temperature, 100% is vaporized in 2200 seconds. It has a relatively high flashpoint of 104° F. and an auto-ignition temperature of 567° F. Its viscosity is 1.2 cps.

The ammonium bicarbonate is a bulking agent that greatly increases that mass to be rolled, distributes the PTFE and platinum black within its bulk and upon its removal collapses the layer but leaves continuous pores. The petroleum distillate acts as a lubricant.

After the five minutes of blending, the formulation is filtered and the filtrate is discarded. The residue from the filtering is made into a ball and fed through horizontal rollers. The roller gap is adjusted to 0.025 inches (0.0635 cm). The rolled pieces are folded and again rolled. The process is repeated eight to ten times. Finally, a strip 10 feet long and 7 inches wide is produced. This material is calendered through the rollers to reduce the thickness to 0.13 inches (0.33 cm).

The material is then air-dried at 35° C. for 48 hours to remove all the solvent. It is then heated to 65° C. for two hours to decompose the ammonium bicarbonate. The resulting film has collapsed to a thickness of 0.001 inch (25 $\mu$m) and it contains the electrocatalyst entwined in the PTFE.

The nickel exmet forming the current collector 40 is dip-coated with FET dispersion. A commercial FEP suspension is diluted to obtain 20% solid content. FEP is a Teflon suspension of tetrafluoroethylene and hexafluoropropylene, i.e. a fluorinated ethylenepropylene copolymer. Its application to nickel exmet is required in order to provide bonding between the nickel and the PTFE. The dip-coated exmet is then air-dried.

The nickel exmet is then laid flat, one side is laminated with the previously prepared layer of electrocatalyst strip and the other side is laminated with a wet-proofing layer of PTFE membrane of the type Gore-Tex S 10415. Gore-Tex is a sheet of PTFE containing micropores which do not pass an aqueous solution. The Gore-Tex heat seals through the nickel exmet and also bonds to the coated nickel exmet. Gore-Tex is not affected by the KOH electrolyte.

Then the laminated exmet structure is sandwiched between foam rubber and hydraulically pressed at 800 psi. Afterwards the electrode structure is transferred to an oven and sintered for ten minutes at 330° C. under 1 atm of nitrogen. The sintering causes the PTFE to flow and to stick to the coated nickel exmet. The thermal treatment further causes the platinum particles to join without agglomerating.

The individual electrodes are then blanked-out using a die. The area of the tab 40 is solid metal and was not perforated during the formation of the nickel exmet. During the previously described processing, the electrode tab 40 was not coated and was physically defined by the die-cutting.

The properties of the hydrogen electrode of this invention were verified by fabricating and analyzing several samples. When immersed in 30% KOH, the hydrogen electrode was hydrophobic and leak-proof. When tested for polarization for hydrogen oxidation, a polarization value of 80 mV at a current density of 50 mA/cm$^2$ was obtained. Tests by mercury porosimetry yielded a porosity of 80% and a median volume pore diameter of 10 $\mu$m. The hydrogen electrode was mechanically strong and easy to handle.

The structure of this new hydrogen electrode is based on an electrocatalyst of platinum on carbon particles for which the weight percentage of platinum is in the neighborhood of 10%. The electrocatalyst is dispersed in strands of PTFE. The electrocatalyst has 80% porosity with a median volume pore diameter of 10 $\mu$m. This property promotes proper distribution of electrolytes among the positive and negative electrodes and the separator in a nickel-hydrogen battery. The structure of the hydrogen electrode is cost effective and the fabrication procedure is amenable to large scale manufacturing.

I claim:
1. An electrode, comprising:
  a perforated conductive foil for collecting current;
  a semi-permeable layer of polytetrafluoroethylene (PTFE) bonded to one side of said foil for wet-proofing said one side and having an average volume pore diameter of 0.1–0.3 $\mu$m; and
  an electrocatalytic layer bonded to the other side of said foil comprising granules of carbon coated with platinum dispersed in a matrix of filamentary PTFE.

2. An electrode as recited in claim 1, wherein said foil comprises nickel.

3. An electrode as recited in claim 2, wherein said nickel foil is an extruded nickel foil.

4. An electrode as recited in claim 1, wherein said semi-permeable layer having a thickness of 25–75 μm.

5. An electrode as recited in claim 1, wherein said electrocatalytic layer having a thickness of 12–40 μm and a medium volume pore diameter of about 10–15 μm.

6. An electrode as recited in claim 1, wherein the weight ratio of platinum-coated carbon to PTFE is between 67:33 and 77:23 and the loading of platinum is about 0.25–0.6 mg/cm$^2$.

7. An electrode as recited in claim 6, wherein:
said foil is an extruded nickel foil;
said semi-permeable layer has a thickness of 15–75 μm; and
said electrocatalytic layer has a thickness of 12–40 m and a medium volume pore diameter of 10–15 μm.

8. A process for fabricating an electrode, comprising the steps of:
blending a mixture of granular polytetrafluoroethylene (PTFE), granular carbon coated with platinum, a bulking agent and a lubricant;
rolling said blended mixture to a thin layer;
drying said layer for removing said bulking agent and lubricant, and for reducing the thickness of said layer;
bonding said dried layer to one side of a conductive grid, said grid acting as a current collector and said bonded dried layer acting as an electrocatalytic layer;
bonding a microporous layer of PTFE to the other side of said conductive grid, said microporous layer acting as a wet-proofing layer; and
sintering said bonded dried layer.

9. A process as recited in claim 8, wherein:
the granular PTFE has an average diameter of 250–750 μm; and
said mixture has a weight ratio of platinum-coated carbon to PTFE between 67:33 and 77:23.

10. A process as recited in claim 9, wherein the weight ratio of the platinum to carbon is between 1:9 and 1:19.

11. A process as recited in claim 10, wherein two said bonding steps comprise the steps of:
laminating said dried layer on said one side of said grid;
laminating said microporous layer on said other side of said grid; and
pressing said laminated grid.

12. A process as recited in claim 11, wherein said conductive grid is an extruded foil of nickel.

13. A process as recited in claim 9, wherein two said bonding steps comprise the steps of:
laminating said dried layer on said one side of said grid;
laminating said microporous layer on said other side of said grid; and
pressing said laminated grid.

14. A process as recited in claim 9, wherein said conductive grid is an extruded foil of nickel.

15. A process as recited in claim 8, wherein the weight ratio of the platinum to carbon is between 1:9 and 1:19.

16. A process as recited in claim 8 wherein said sintering step comprises heating for approximately ten minutes at a temperature of substantially 330° C. in a nitrogen environment.

* * * * *

UNITED STATES PATENT AND TRADEMARK OFFICE
CERTIFICATE OF CORRECTION

PATENT NO. : 4,585,711

DATED : April 29, 1986

INVENTOR(S) : Hariharan Vaidyanathan

It is certified that error appears in the above-identified patent and that said Letters Patent is hereby corrected as shown below:

Column 6, line 6, change "with FET dispersion" to --with FEP dispersion--.

Column 7, line 22, change "12-40 m" to --12-40μm--.

Signed and Sealed this

Eleventh Day of November, 1986

Attest:

DONALD J. QUIGG

Attesting Officer     Commissioner of Patents and Trademarks